United States Patent [19]
Sato et al.

[11] Patent Number: 5,124,812
[45] Date of Patent: Jun. 23, 1992

[54] DIGITAL RECORDING AND REPRODUCING APPARATUS FOR MUSE SIGNAL

[75] Inventors: Kenichi Sato, Moriguchi; Yoshinobu Nishikawa, Kobe; Norihisa Takayama, Hirakata; Tateo Toyama, Gifu, all of Japan

[73] Assignee: Sanyo Electric Co., Ltd., Moriguchi, Japan

[21] Appl. No.: 460,578

[22] Filed: Jan. 3, 1990

[30] Foreign Application Priority Data

Jan. 6, 1989 [JP] Japan .................................. 1-1595
Oct. 1, 1989 [JP] Japan .................................. 1-3094

[51] Int. Cl.$^5$ .................................. H04N 5/76
[52] U.S. Cl. .................................. 358/343
[58] Field of Search ........... 358/310, 335, 341, 343, 358/133, 138, 12, 140, 141, 142, 143; 360/39

[56] References Cited

U.S. PATENT DOCUMENTS 4,692,801 9/1987 Ninomiya et al. .................. 358/133
4,965,667 10/1990 Trew et al. ........................ 358/138

FOREIGN PATENT DOCUMENTS 61-238184 10/1986 Japan .

OTHER PUBLICATIONS

Y. Ninomiya et al., "Development for the Muse System", NHK Technical Research, Feb. 1987, vol. 39, No. 2, pp. 18–53.
Y. Ninomiya, "Muse System", Television Journal, Aug. 1988, vol. 42, vol. 42, No. 8, pp. 51–58.

Primary Examiner—Robert L. Richardson
Attorney, Agent, or Firm—Peter L. Michaelson

[57] ABSTRACT

A MUSE encoder converts a HDTV signal into a MUSE signal and supplies the converted MUSE signal to a digital recording circuit 52 of a digital VTR. The supplied MUSE signal includes audio data and additional information, each being a ternary signal. A state of a ternary signal at one sampling point is discriminated by a ternary discrimination circuit 102, with the result thereof being indicated as a two-bit digital signal by a two-bit indicating circuit 103. Accordingly, the number of bits required for the audio data at one sampling point can be compressed from eight bits to two bits. In addition, by converting two successive discriminated results by the ternary discrimination circuit 102 into a binary signal by means of a ternary/binary converting circuit 104, the number of bits required at two sampling points can be reduced from 16 bits to three bits. As a result, a recording bit rate for the MUSE signal, to be digitally recorded on the magnetic tape, can be reduced.

16 Claims, 17 Drawing Sheets

FIG. 4
(PRIOR ART)

| BIT NUMBER | CONTENTS OF CONTROL |
|---|---|
| 1 | INTER-FIELD SUB-SAMPLING PHASE (Y) "1" WHEN SAMPLING POINT IS AT THE RIGHT |
| 2<br>3<br>4<br>5 | HORIZONTAL MOTION VECTOR (2'C) STOP WHEN PICTURE MOVES TO THE RIGHT<br>#2, LSB<br>1CK UNIT OF 32MHz |
| 6<br>7<br>8 | VERTICAL MOTION VECTOR (2'C) STOP WHEN PICTURE MOVES DOWN<br>#6, LSB<br>UNTI OF LINE |
| 9 | Y SUB-SAMPLING PHASE "1" WHEN SAMPLING POINT IS AT THE RIGHT IN ODD LINE |
| 10 | C SUB-SAMPLING PHASE "1" WHEN LINE NO./2 IS ODD NUMBER AND SAMPLING POINT IS AT THE LEFT |
| 11<br>12 | NOISE REDUCTION CONTROL<br>USE NOISE REDUCTION OF HIGHER DEGREE IN ORDER OF VALUE |
| 13 | ITERATION FLAG |
| 14 | MOTION DETECTING (1) "1" SELECTS LOWER SENSITIVITY SENSITIVITY CONTROL |
| 15 | MOTION DETECTING SENSITIVITY CONTROL (2) |
| 16<br>17<br>18 | MOTION INFORMATION { 0: NORMAL<br>1: PERFECT STILL PICTURE<br>2: QUASI-STILL PICTURE<br>3~7: INDICATES DEGREE OF MOTION |
| 19 | EMPTY |
| 20 | AM/FM "1" INDICATES AM WITHOUT EMPHASIS |
| 21<br>∫<br>32 | SPARE |

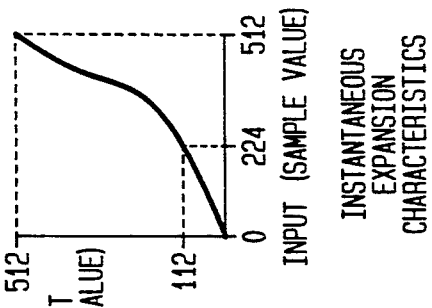
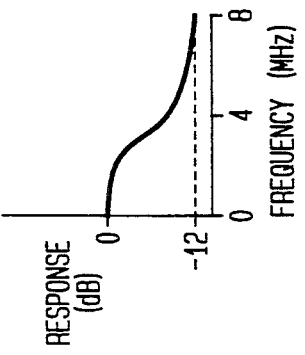
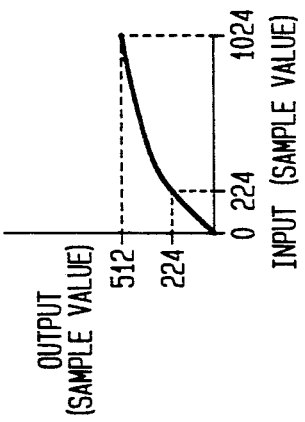
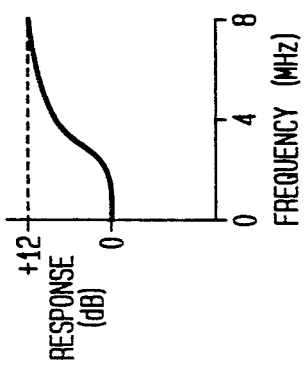

DIGITAL RECORDING AND REPRODUCING APPARATUS FOR MUSE SIGNAL

BACKGROUND OF THE INVENTION

1. Field of the Invention

The present invention relates generally to digital recording and reproducing apparatuses, and, more particularly, digital recording and reproducing apparatuses for digitally recording on recording media, such as a magnetic tape and an optical disc, a high definition television (referred to as HDTV hereinafter) signal transmitted with a bandwidth being compressed in a MUSE (Multiple Sub-Nyquist Sampling Encoding) system and reproducing thus recorded signal.

2. Description of the Background Art

In recent years. HDTVs have been developed for practical use. Each of R, G and B (red, green and blue) signals outputted from a HDTV camera has a bandwidth of 30 MHz, and therefore a HDTV signal as a whole has a wide bandwidth of 90 MHz. In case of broadcasting such a HDTV signal through one channel of a broadcasting satellite at the band of 12 MHz, a bandwidth of the HDTV signal should be compressed (that is, coded with high efficiency) such that it can be transmitted at 27 MHz which is a bandwidth occupied by one channel.

A bandwidth compressing system developed by NH (Nippon Hoso Kyokai or Japan Broadcasting Corporation) for the above described purpose is the MUSE system. The MUSE system is disclosed in detail in (1) "DEVELOPMENT FOR THE MUSE SYSTEM" by Y. Ninomiya et al. on pp. 18–53, No. 2, Vol. 39 of NHK Technical Research issued February 1987; (2) "MUSE SYSTEM" by Y. Ninomiya on pp. 51–58, No. 8, Vol. 42 of Television Journal issued August, 1988 and (3) U.S. Pat. No. 4,692,801.

An outline of the MUSE system will be described hereinafter. FIG. 1 is a schematic block diagram showing a structure of a MUSE encoder for compressing a bandwidth of a HDTV signal according to the MUSE system and outputting the bandwidth-compressed HDTV signal as a MUSE signal.

Referring to FIG. 1, R, G and B of the HDTV signal each having a bandwidth of 30 MHz are supplied in parallel from, for example, a HDTV camera (not shown), and bands of which are limited by a low pass filter (LPF) 1 having a cut-off frequency of 21–22 MHz. After passing through the LPF1, the R, G and B of the HDTV signal are A/D converted by an A/D converter 2 at a sampling frequency of 48.6 MHz. The HDTV signal converted into a digital signal is subjected to a reverse processing with respect to the gamma characteristic of a camera in a gamma processing circuit 3, which is further applied to a matrix circuit 4.

In the matrix circuit 4, R, G, B of the HDTV signal are converted into a luminance (Y) signal and two color difference (C) signals, then bands of the two C signals are further limited by a LPF 5. As a result, the Y signal of 20 MHz and the two C signals each being of 7 MHz are applied to a TCI (Time Compressed Integration) encoder 6. The TCI encoder 6 puts the two C signals into a line sequence and compresses a time base thereof into ¼, and thereafter which C signals are further time divisional multiplexed into the Y signal to output one series of the TCI video signals.

Then a sub-sampling processing for compressing a bandwidth of the TCI signal is carried out. Described in more detail, a TCI signal of a still picture portion in a picture frame is subjected to a field off-set sub-sampling processing and a frame off-set sub-sampling processing by a sub-sampling circuit 7 for processing still picture and a TCI signal of a motion picture portion is subjected to a line off-set sub-sampling processing by a sub-sampling circuit 8 for processing motion picture. Such various sub-sampling processings are described in detail in the above described references (1), (2) and (3), which are not closely relevant to the present invention., and no further description will be given here.

A motion detection circuit 9 detects the degree of a motion of picture in a motion picture portion, and a mixer 10 adjusts a mixing ratio of outputs of the still picture processing sub-sampling circuit 7 and the motion picture processing sub-sampling circuit 8 in response to the detected degree of the motion. As a result of the sub-sampling processing, the bandwidth of the TCI signal is compressed to 8.1 MHz.

Thereafter, a gamma processing for a transmission path is performed by a gamma processing circuit 11 for the output of the mixer 10 and an emphasis processing is further performed by an emphasis circuit 12. A control signal (described later), a synchronizing signal and a digital audio signal from an audio encoder 14 (described later) are time divisional multiplexed into the thus processed video signal of 8.1 MHz by multiplex circuit 13. By D/A converting thus obtained signal by a D/A converter 15 and limiting band of the D/A converted signal by a LPF 16, a transmission signal according to the MUSE system (referred to as MUSE signal hereinafter) can be obtained.

The transmission according to the MUSE system is a transmission of analog sampled values and the sampling frequency thereof is 16.2 MHz. The above described MUSE signal transmission system having a bandwidth of 8.1 MHz fulfills a first standard of Nyquist at a transmission rate of 16.2 MHz. Accordingly, on a receiving side of the MUSE signal thus transmitted, the received MUSE signal can be completely re-sampled using a clock which is in synchronization with the train of the sampled values and has a clock rate twice the Nyquist frequency (8.1 MHz), that is, a clock rate of 16.2 MHz.

The received MUSE signal is restored to the original HDTV signal basically through a processing reversal to the above described processing for generating the MUSE signal. FIG. 2 is a schematic block diagram showing a structure of a MUSE decoder for restoring a received MUSE signal to a HDTV signal.

Referring to FIG. 2, first the received MUSE signal has a bandwidth limited by a LPF 21, which is further A/D converted by an A/D converter 22. An output of the A/D converter 22 is subjected to the de-emphasis processing by a de-emphasis circuit 24, which is further subjected to a reverse processing with respect to the gamma characteristic of a transmission path by a gamma processing circuit 26. In addition, the output of the A/D converter 22 is also applied to a separation circuit 23, thereby the audio signal which has been time division multiplexed into the received MUSE signal is extracted to be applied to an audio decoder 25.

Furthermore, signal interpolation processing is performed to an output of the gamma processing circuit 26. More specifically, an intra-field interpolation processing is performed by a motion picture processing circuit 27 for a signal of a motion picture portion in the picture frame and inter-frame and inter-field interpolation processings are performed by a still picture processing circuit 28 for a signal of a still picture portion. These signal interpolation processings are also described in the above described references (1), (2) and (3) and no further description will be given here.

A motion detection circuit 29 detects the degree of motion in the motion picture portion. A mixer 30 adjusts a mixing ratio of outputs of the circuits 27 and 28 in response to the detected degree of motion. The TCI video signal thus restored are supplied to a TCI decoder 31 to be TCI decoded into the original Y signal and the two C signals. The bandwidths of the two C signals are limited by a LPF 32. Then, the Y signal and the C signals are subjected to a reverse matrix processing by a reverse matrix circuit 33, so that the original R, G, and B signals are obtained. Outputs of the reverse matrix circuit 33 is D/A converted by a D/A converter 34 and restored as the HDTV signals of R, G, B.

FIG. 3 is a diagram schematically showing a signal form of such a MUSE signal as described above. As the foregoing, the sampling frequency of the MUSE signal is 16.2 MHz, and the signal form of FIG. 3 is numbered at sampling intervals of 16.2 MHz. More specifically, as shown in FIG. 3, 1H period, that is, one scanning line (referred to as a line hereinafter) comprises 480 sampling points, and 1 frame (two fields) is comprised of 1125 lines. Of the 480 sampling points in one line, 11, 94, 347, 95 and one sampling points are respectively allotted to a horizontal synchronizing signal (HD), a C signal, a Y signal, a control signal and a guard portion for preventing signal interference between the Y and C, respectively. The C signal is included in the signal regions having the line numbers 43–558 and 605–1120 wherein R-Y signal and B-Y signal are line-sequentially multiplexed in the odd-numbered lines and the even-numbered lines respectively. The Y signal is included in the signal regions having the line numbers 47–562 and 609–1124. The control signal is included in the signal regions having the line numbers 559–563 and 1121–1125. FIG. 4 shows the contents of the control signal including sub-sampling phase, motion vector amount and codes for discriminating between an FM modulation and an AM modulation in a modulation system in transmitting MUSE signals. The contents of such a control signal is described in detail in the above described references (1), (2) and (3), and no further description will be given here.

The rest of the regions in the signal form of FIG. 3 correspond to a vertical blanking period, wherein the regions having the line numbers 1 and 2 each includes VIT signals used for equalization of a transmission path and the regions having the line numbers 563 and 1125 each includes clamp level signals used for defining an neutral level of the C signal and for AFC. In addition, the signal regions having the line numbers 3–46 and 565–608 each includes audio data and other additional information. The additional information is non-specified, arbitrary data. The regions having the line numbers 43–46 and 605–608 each includes a part of the C signal region.

Now, a recording and reproducing apparatus for the above described MUSE signal will be described. On the other hand, an analog recording system and a digital recording system can be employed as the recording and reproducing system for the MUSE signal, and the former is used for a video tape recorder (VTR) and an optical disk player for FM modulating and recording a MUSE signal. On the other hand, a digital VTR has developed as utilizing the latter system, by which a digital signal, which can be obtained by A/D converting a MUSE signal at a re-sampling frequency of 16.2 MHz, is recorded on a magnetic tape and then reproduced, which is disclosed in Japanese Patent Laying Open No. 61-238184.

FIG. 5 is a schematic block diagram showing a structure of such a digital VTR. In FIG. 5, a MUSE signal supplied to an input terminal 51 in recording from, for example, the MUSE encoder of FIG. 1 is converted into a digital MUSE signal by a digital recording circuit 52, and thereafter subjected to processing such as time base compression and addition of error correcting codes, and further modulated. The modulated digital MUSE signal is supplied to a rotary magnetic head 57 through a switching circuit 55 and a rotary transformer 56 and recorded on a magnetic tape 58. In reproducing, the digital MUSE signal recorded on the magnetic tape 58 is read out by the rotary magnetic head 57 and applied to a digital reproducing circuit 54 through the rotary transformer 56 and the switching circuit 55. The digital reproducing circuit 54 demodulates the digital signal and subjects the demodulated signal to such processings as time base correction and code error correction, thereby outputting the demodulated digital signal as the MUSE signal. The outputted MUSE signal is restored to the original HDTV signal by, for example, the MUSE decoder of FIG. 2 and supplied to a HDTV monitor TV or the like.

FIG. 6 is a block diagram showing in detail the digital recording circuit 52 shown in FIG. 5. In FIG. 6, the MUSE signal inputted to the input terminal 51 has a bandwidth limited by a Nyquist filter 61 which is the LPF of 8.1 MHz, which is converted into a digital signal by an A/D converter 63 thereafter. The MUSE signal is transmitted in the form of the sampled values as described above and the sampled values should be reproduced correctly. For this purpose, a re-sampling clock of 16.2 MHz in synchronization with the MUSE signal is reproduced by a PLL circuit 62, and A/D conversion is performed based on this clock.

The digital MUSE signal outputted from the A/D converter 63 is separated into a video signal, a control signal and other signal such as an audio signal by a separation circuit 64, and each of which is stored in a memory 66. On this occasion, predetermined processings are performed to the audio signal and the control signal by an audio signal processing circuit 65 and a control signal processing circuit 67, respectively.

Then, the audio signal and the video signal stored in the memory 66 are sequentially read out to a parity generating circuit 68. The parity generating circuit 68 generates a vertical parity and a horizontal parity so as to constitute a correction block shown in FIG. 7 and store the same in the memory 66. One unit of the correction block shown in FIG. 7 comprises an audio signal of $n_1$ words, a video signal of $n_2$ words and a horizontal parity of $n_3$ words with respect to a horizontal direction and an audio or video signal of $m_1$ words and a vertical parity of $m_2$ words with respect to a vertical direction. In one example of a digital VTR of a practical use, $n_1$, $n_2$, $n_3$, $m_1$ and $m_2$ are set to 2, 120, 5, 86 and 4, respectively.

In addition, k blocks of the correction blocks of FIG. 7 constitute one scan track (referred simply to as a track hereinafter) and L scans of the tracks constitute the data of one field. In the digital VTR of the above described embodiment, one field is comprised of 6 tracks and each track is comprised of 4 correction blocks. Namely, the correction block of FIG. 7 is the data corresponding to 1/24 field.

Then, the audio data, the video data, the control signal and the parity are sequentially read out from the memory 66 and distributed to the respective channels so as to be applied to data frame composing circuits 72a and 72b. A plurality of systems (for example two systems) of circuits are provided in the subsequent stages of the data frame composing circuits because the channel distribution recording system is adopted. In addition, the synchronizing signal and the address signal are supplied from a synchronizing signal generating circuit 69 and an address signal generating circuit 70 respectively to both of the data frame composing circuits 72a and 72b. The data frame composing circuits 72a and 72b compose one unit of data frame including the synchronization data of $l_1$ words, the address data of $l_2$ word, the data of $(n_1+n_2+n_3)$ words comprising the audio, the video and the parity, in this sequence in accordance with the supplied data as shown in FIG. 8 (A) and output the same. More specifically, the data frame shown in FIG. 8(A) corresponds to one horizontal line of data in the correction block of FIG. 7, and the address data of $l_2$ words includes the data comprising the number for identifying the corresponding data frame, the numbers of the block and the track including the corresponding data frame and the numbers of the field and the frame (picture). The data frame composing circuits 72a and 72b sequentially feed the above described data frames corresponding to respective lines of the correction block and apply the same to the data composing circuits 73a and 73b.

With respect to the control signal, the data frame composing circuits 72a and 72b, in response to the control signal read out from the memory 66, the synchronizing signal and the address signal from the synchronizing signal generating circuit 69 and the address signal generating circuit 72 respectively, compose one unit of the data frame including the synchronization data of $l_1$ words, the address data of $l_2$ words and the control signal of $(n_1+n_2+n_2)$ words in this sequence as shown in FIG. 8B and output the same to be applied to the data composing circuits 73a and 73b, respectively.

A preamble signal and a postamble signal are supplied from a preamble/postamble signal generating circuit 71 to the data composing circuits 73a and 73b, respectively. The data composing circuits 73a and 73b compose signals of one track having an arrangement as shown in FIG. 9, based on the various data received from the data frame composing circuits 72a and 72b and the preamble/postamble signal generating circuit 71. The signal of one track shown in FIG. 9 comprises a preamble signal of $S_1$ frames, a control signal of $S_2$ frames, data of $S_4$ frames comprising audio, video and parity, a control signal of $S_2$ frames and a postamble signal of $S_3$ frames.

The preamble portion and the postamble portion are provided at the opposite edges of the recording track as shown in FIG. 9 for a margin in switching the head, that is, a leading-in time period for clock reproduction and the absorption of rotary jitter of a cylinder and the like, in the digital VTR for recording using a rotary head. The preamble signal and the postamble signal recorded in these portions are usually signals having a fixed frequency corresponding to the maximum value or one fraction of integral number of the recording frequency of the signal to be digitally recorded.

As shown in FIG. 9, the signals each composed one scan track basis are modulated in digital modulation circuits 74a and 74b, and thereafter amplified by recording amplifying circuits 75a and 75b. Then, the signals of two channels outputted from the recording amplifying circuits 75a and 75b are switched into two systems by the switching circuit 55 of FIG. 5 in accordance with a rotating phase of the rotary head, and fed to the rotary magnetic heads 57 through the rotary transformer 56, and thereafter are further recorded on the magnetic tape 58.

FIG. 10 is a block diagram showing in detail the digital reproduction circuit 54 shown in FIG. 5. Referring to FIGS. 5 and 10, in reproduction, the signal recorded on the magnetic tape 58 is read out by the rotary magnetic heads 57 and applied to reproduction (playback) amplifying circuits 81a and 81b in the digital reproduction circuit 54 through the rotary transformer 56 and the switching circuit 55. The signals amplified by the reproduction amplifying circuits 81 and 81b are waveform shaped by waveform equalizing circuits 82a and 82b so as to compensate the characteristics lost in the magnetic recording and reproducing system and applied to demodulation circuits 83a and 83b and PLL circuits 84a and 84b. The PLL circuits 84a and 84b generate clocks based on the applied reproduced signal, apply the clocks to the demodulation circuits 83a and 83b respectively, so, in response thereto, demodulation circuits 83a and 83b demodulate the outputs of the waveform equalizing circuits 82a and 82b to yield the original data signals.

The demodulated digital signals are applied to the synchronization detecting circuits 85a and 85b to detect the synchronization data. Synchronization separating and serial/parallel converting circuits 86a and 86b separate the data from the demodulated digital signals to carry out serial/parallel conversion based on the detected synchronizing signals and then write the separated data into the memory 87 on a word basis. The data written in the memory 87 is sequentially read out to the error correction circuit (ECC) 88, subjected to correction processing and interpolation processing, and written into the memory 87 again.

The data stored in the memory 87 is read out to a MUSE decoder interface circuit 89 to be restored to the original MUSE signal form, and thereafter outputted from the output terminal 53. The form of the MUSE signal outputted from the output terminal 53, namely, whether it is outputted as an analog signal or a digital signal, or how a video signal and an audio signal are separated is determined in accordance with the specification of the MUSE decoder (for example, the decoder shown in FIG. 2) to be connected in the subsequent stage of the terminal 53.

Meanwhile, in the structure of the MUSE signal shown in FIG. 3, the audio data and other additional information (referred simply to as the audio data hereinafter) included in the signal regions indicated as the line numbers 3–46 and 565–608 before they are multiplexed into a MUSE signal are originally binary signals comprising "0" or "1" to be transmitted in serial at a bit rate of 1.35 Mbps. Since the audio data as the binary signal is transmitted in the above described MUSE signal transmission system having a Nyquist frequency of 8.1 MHz, it is subjected to a processing such as a time base compression by the audio encoder 14 (see FIG. 1), and then time division multiplexed into the vertical blanking portion of the MUSE signal shown in FIG. 3.

FIG. 12 is a block diagram showing a circuit structure for the audio data processing included in the audio encoder 14 and an operational principle thereof is disclosed in detail in Japanese Patent Laying-Open No. 62-172874. Referring to FIG. 12, the audio data having the bit rate of 1.35 Mbps inputted from an input terminal 91 has a time base compressed by a time base compression circuit 92, resulting in a signal having the bit rate of 18.225 Mbps. The binary signal of 18.225 Mbps is converted into a ternary signal comprising "0", "1" or "2" by a binary/ternary converting circuit 93, based on a binary/ternary conversion table shown in FIG. 11 and outputted at the frequency of 12.15 Mbaud. The ternary signal is frequency-converted by a frequency conversion circuit 94 and outputted from the terminal 95 as a signal having a frequency of 16.2 MHz. As a result, a sampling frequency of the audio data becomes the same as that of the MUSE video signal, thereby enabling the transmission in the transmission system of the Nyquist frequency of 8.1 MHz. The audio data is further supplied to a multiplex circuit 13 constituting the MUSE encoder shown in FIG. 1 to be time divisional multiplexed into the MUSE video signal.

As the foregoing, audio data multiplexed into a MUSE video signal is basically a digital signal of a ternary value and different from an Y signal and a C signal which are originally analog signals. The following problems occur when the bit number, that is, a resolution, in quantizing such a MUSE signal in the recording circuit of the digital VTR (FIG. 6) is set on the basis of the resolution of the analog value (for example eight bits) to quantize the audio data which is the ternary signal.

More specifically, the audio data in the form of the ternary signal occupies about 8% of the data capacity of the entire MUSE signal, so that when the audio data is quantized by the same resolution as that of the video signal portion that is to be digitally recorded, instead of one bit, as many as eight bits are required for the quantization of the analog signal. As a result, as the digital recording rate increases, recording wavelength is shortened, which, in turn, increases the error in the recorded data.

In case of FM transmitting a MUSE signal generated by the MUSE encoder of FIG. 1 through, for example, satellite broadcasting, emphasis and instantaneous amplitude compression processings should be performed in the emphasis circuit 12 in the MUSE encoder. In addition, in case of receiving the MUSE signal thus processed and restoring the same to the original HDTV signal in the MUSE decoder of FIG. 2, the de-emphasis and instantaneous amplitude expansion processings should be performed in the de-emphasis circuit 24 in the MUSE decoder.

FIGS. 13A–13D and 13F are graphs and waveform diagrams for explaining these various processings. First, in the MUSE encoder of FIG. 1, the video signal which changes white→black→white as shown by waveform (1) in FIG. 13E is subjected to a processing of an emphasis characteristic shown in FIG. 13 (A) by the emphasis circuit 12, so that the edge portions of the video signal are emphasized as shown in waveform (2) in FIG. 13 (E). The signal is subjected to a processing of instantaneous amplitude compression characteristic of FIG. 13 (B) by the emphasis circuit 12, so that the emphasis of the edge portions is suppressed as shown in waveform (3) in FIG. 13E. The signal thus processed is FM transmitted, and after the signal is received waveform (4) in FIG. 13E, it is subjected to the de-emphasis processing of the characteristic shown in FIG. 13 (C) by the de-emphasis circuit 24 in the MUSE decoder of FIG. 2, resulting in a signal having waveform shown in waveform (5) in FIG. 13E. The signal is subjected to an instantaneous amplitude expansion processing of the characteristic shown in FIG. 13 (D) also by the de-emphasis circuit 24 to be restored to the video signal shown waveform (6) in FIG. 13E. These processings are peculiar to an FM transmission of the MUSE signal and is not performed in case of AM transmission.

In case of the FM transmission of the MUSE signal in this manner, the video signal in the MUSE signal is subjected to the emphasis processing. In recording such a MUSE signal by a conventional digital VTR, in order to obtain a level width from a black level to a white level of the reproduced video signal having the eight bits of resolution (−128 to 127) as shown in waveform (6) in FIG. 13E, the video signal to be recorded waveform (4) in FIG. 13E should be quantized with ten bits of resolution (−512 to 511) to be digitally recorded. Namely, generally in the MUSE system, in order to obtain a reproduced video signal having N (N is a positive integer) bit of resolution, digital recording should be performed with (N+2) numbers of quantization bits. As a result, in the digital recording and reproducing apparatus for a MUSE signal such as a digital VTR, as the recording bit rate increases, a recording wavelength is shortened, which in turn, increases errors in the recorded data.

SUMMARY OF THE INVENTION

An object of the present invention is to prevent generation of errors in the recorded data in a digital recording apparatus for the MUSE signal.

Another object of the present invention is to reduce a bit rate for the recorded data in a digital recording apparatus for the MUSE signal without enlarging a circuit structure.

Briefly stated, the present invention is a digital recording apparatus for digitally recording a MUSE signal comprising a plurality of kinds of data on a recording medium. At least part of the plurality of data is coded or modulated using the number of bits larger than that of the original HDTV signal. In the digital recording of such a MUSE signal, the data having the increased number of bits is subjected to a processing for reducing the bit number and is thereafter recorded on the recording medium.

According to another aspect of the present invention, at least an audio signal in the MUSE signal is converted into a ternary signal with an increased bit number. This audio signal is then converted into the original binary signal at the time of digital recording.

According to a further aspect of the present invention, at least a video signal in the MUSE signal is subjected to the emphasis processing with the increased number of bits, and at the time of the digital recording, this audio signal is subjected to de-emphasis processing.

Therefore a principal advantage of the present invention is that the amount of data information to be digitally recorded can be drastically compressed to reduce a recording bit rate for the entire MUSE signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the contents of a control signal in the MUSE signal.

FIGS. 13A-13D and FIG. 13E are respectively graphs and waveform diagrams for explaining a signal processing of a conventional digital VTR.

DESCRIPTION OF THE PREFERRED EMBODIMENTS

Figure 10:
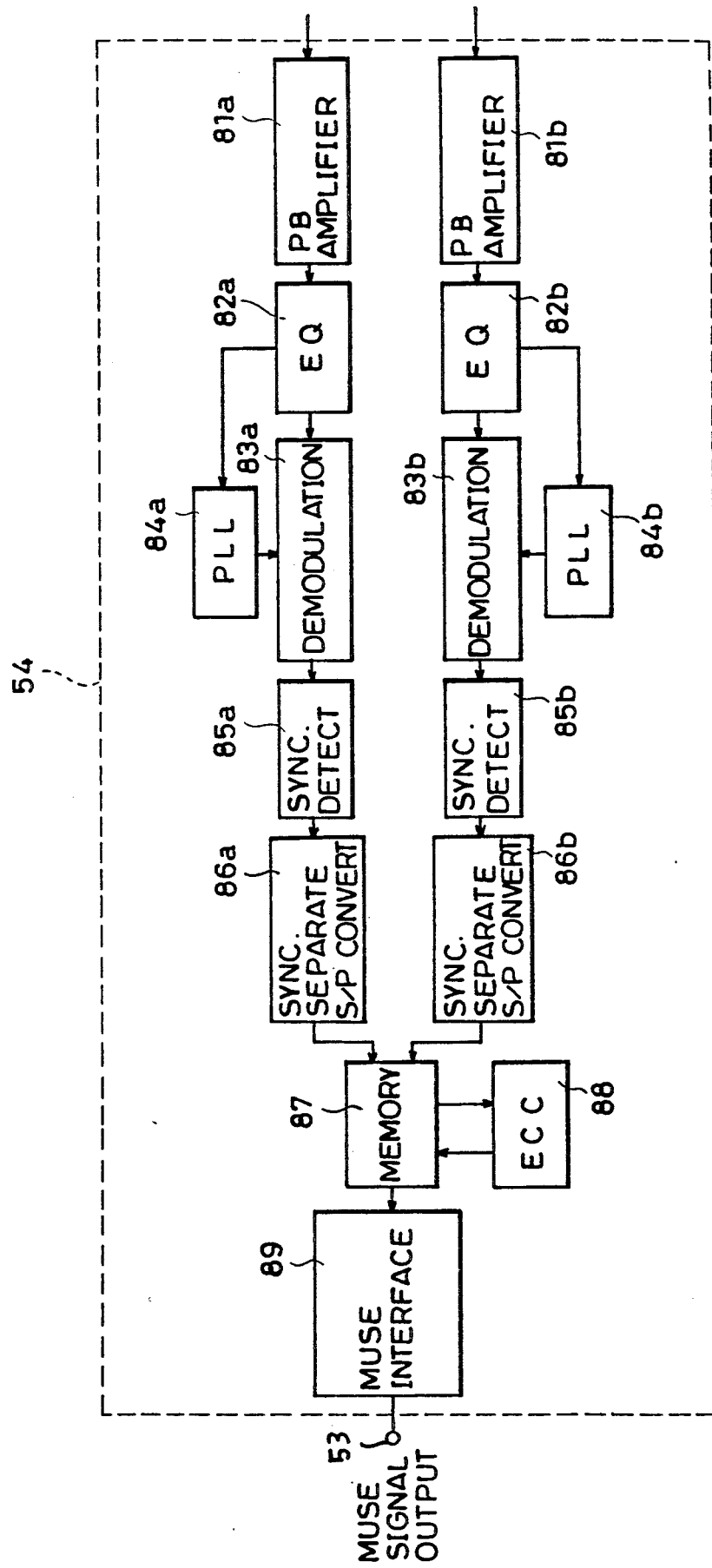
FIG. 10 is a block diagram showing in detail a digital reproducing circuit shown in FIG. 5.
Figure 14:
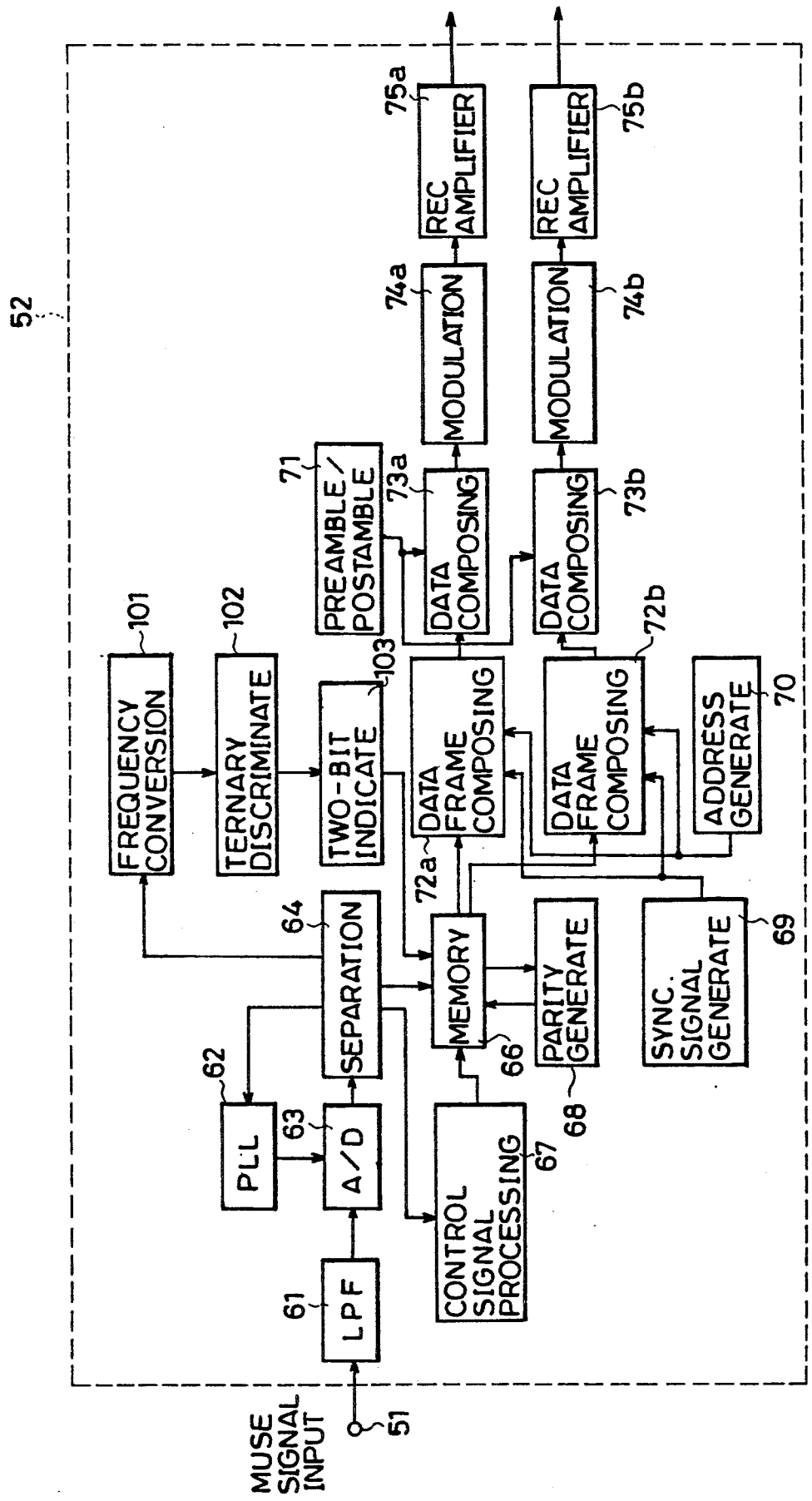
FIG. 14 is a block diagram showing a digital recording circuit of a digital VTR according to a first embodiment of the present invention.

FIG. 14 is a block diagram showing a digital recording circuit of a digital VTR according to a first embodiment of the present invention. A digital recording circuit 52, in the same manner as the prior art shown in FIG. 5, receives a MUSE signal from an input terminal 51, modulates the same into a recording signal of two channels and supplies the modulated signal to a switching circuit 55. A digital recording and reproducing system (55-58) and a digital reproducing circuit 54 of the digital VTR according to this embodiment are the same as those of the prior art shown in FIG. 5 and FIG. 10, and no farther description will be given.

Figure 6:
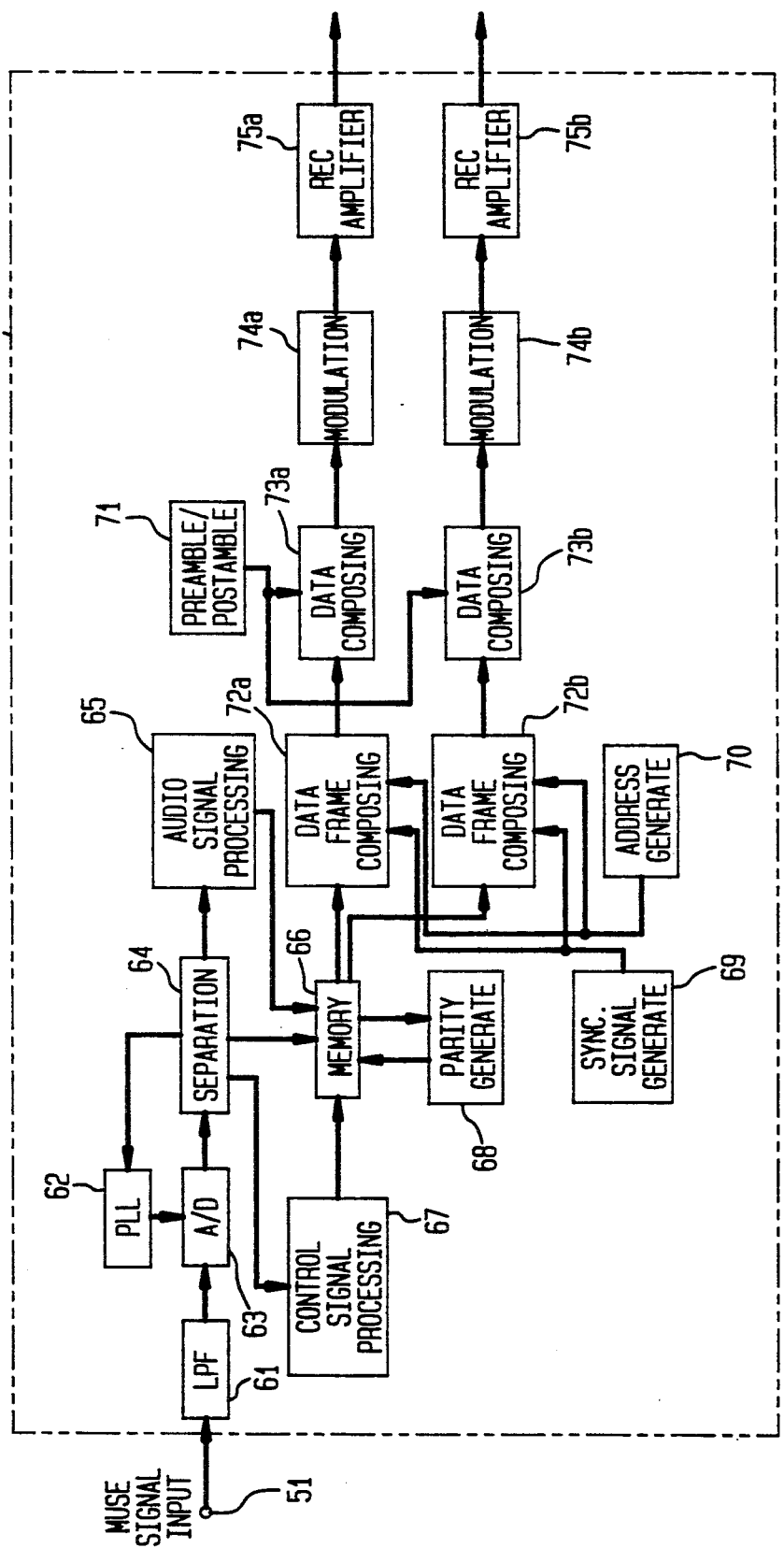
FIG. 6 is a block diagram showing in detail a digital recording circuit shown in FIG. 5.
Figure 7:
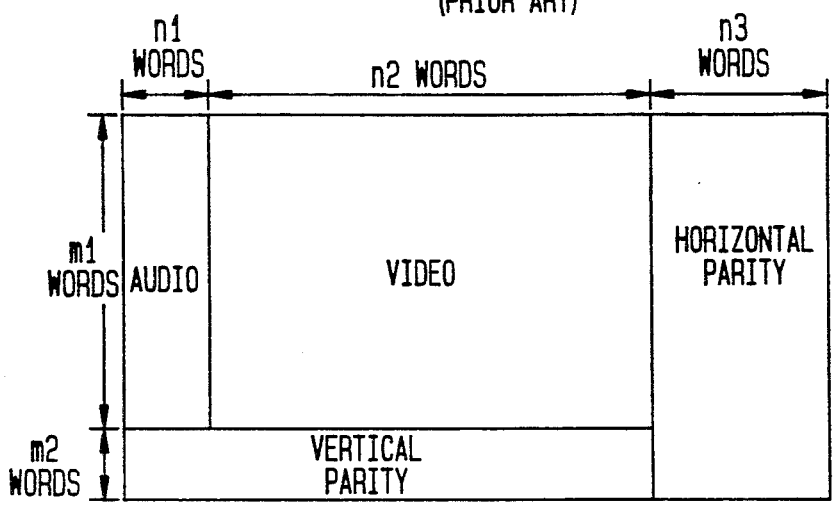
FIG. 7 is a diagram showing a correction block of a MUSE signal.
Figure 8A:
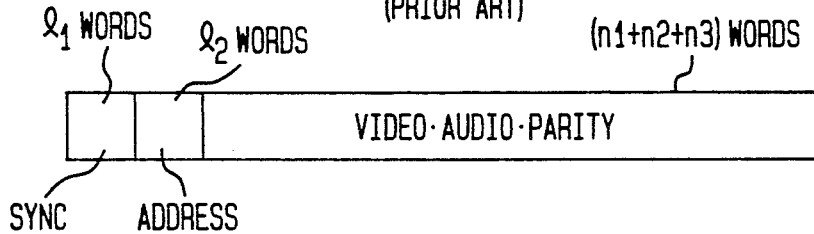
FIGS. 8A, 8B and FIG. 9 are diagrams showing structures of a recording data frame.
Figure 8B:
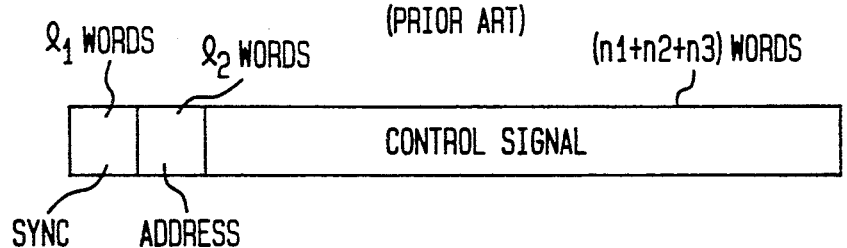
Figure 9:
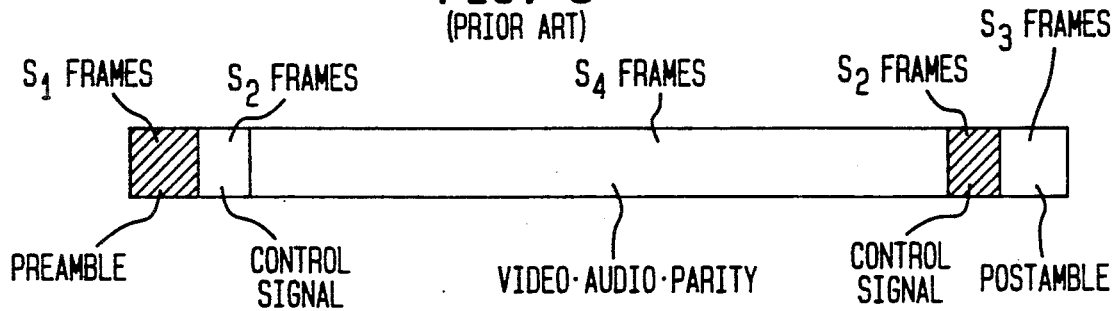

The digital recording circuit 52 shown in FIG. 14 is the same as the conventional digital recording circuit 52 shown in FIG. 6 except for the following points, so that no further description will be repeated for the parts which are the same in both circuit. Namely, in place of the audio processing circuit 65 of FIG. 6, a frequency converting circuit 101, a ternary discrimination circuit 102 and a two-bit indicating circuit 103 are provided. The audio data (including the additional information) is separated by a separation circuit 64 from the MUSE signal which has been A/D converted by an A/D converter 63. The separated audio data is applied to the frequency converting circuit 101. The frequency converting circuit 101 converts the audio data having a sampling frequency of 16.2 MHz into a ternary signal having a sampling frequency of 12.15 MHz. The ternary signal is applied to the ternary discrimination 102, which circuit discriminates a tri-state of the ternary signal at one sampling point, that is, which level the signal has among 0, 1 and 2 and applies one discrimination result to the two-bit indicating circuit 103. The two-bit indicating circuit 103 indicates the obtained result of the ternary discrimination as a digital signal of two bits. More specifically, while the MUSE signal resampled in the A/D converter 63 includes eight bits at one sampling point, the value indicated by a ternary signal at the one sampling point, that is, 0, 1 or 2 can be indicated by a binary signal of two bits. Such a digital signal of two bits is stored in a memory 66. That is, the number of bits required for the audio data at one sampling point can be reduced from eight bits to two bits, thereby drastically reducing a bit rate for a signal to be digitally recorded on a magnetic tape.

Figures 11, 12:
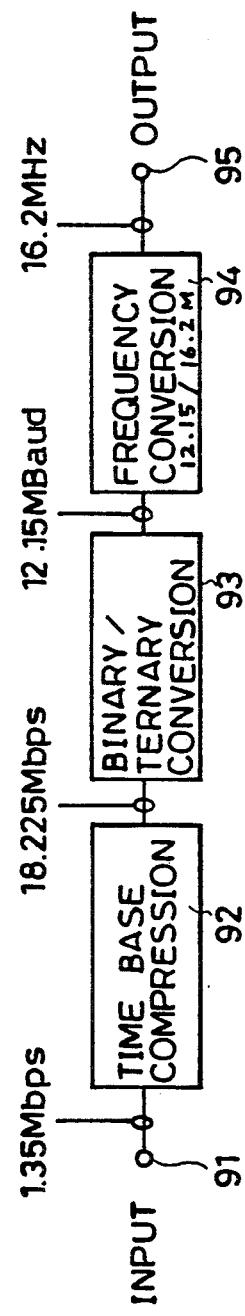
FIG. 11 is a diagram showing a binary/ternary conversion table.
FIG. 12 is a block diagram showing the contents of an audio encoder included in a MUSE encoder, such as audio encoder 14 shown in FIG. 1.
Figure 15:
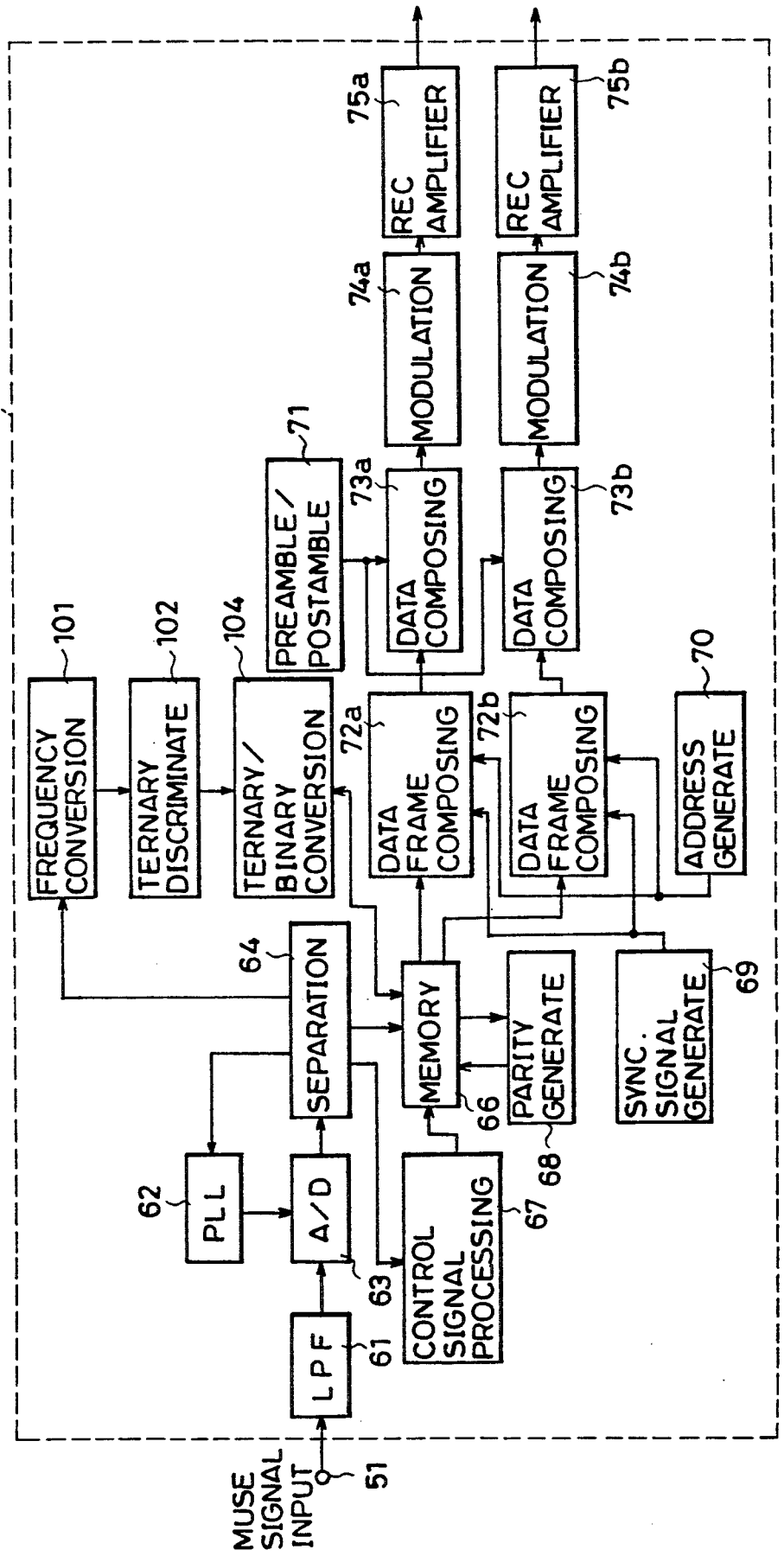
FIG. 15 is a block diagram showing a digital recording circuit of a digital VTR according to a second embodiment of the present invention.

FIG. 15 is a block diagram showing a digital recording circuit of a digital VTR according to a second embodiment of the present invention. The digital recording circuit 52 shown in FIG. 15 is the same as the first embodiment shown in FIG. 4 except for the following points. Namely, in place of the two-bit indicating circuit 103 of FIG. 14, a ternary/binary converting circuit 104 is provided. More specifically, the ternary discrimination circuit 102 applies to the ternary/binary converting circuit 104 a tri-state of the ternary signal at each sampling point applied from the frequency converting circuit 101, that is, a result of discrimination among the signal levels of 0, 1 and 2. The ternary/binary converting circuit 104, upon receiving two discrimination results in succession, converts the same into a digital (binary) signal of three bits based on a conversion table shown in FIG. 11. Namely, while the MUSE signal resampled in the A/D converter 63 includes a total of 16 bits at two sampling points, these two sampling points almost correspond to two ternary signals and the values indicated by the two ternary signals can be indicated by binary signals having three bits. Then, such a digital signal having three bits is stored in the memory 66. That is, the number of bits required for the audio data at the two sampling points can be reduced from 16 bits to 3 bits by the circuit of FIG. 15, thereby reducing a bit rate for a signal to be digitally recorded on the magnetic tape.

Both of the two-bit indicating circuit 103 shown in FIG. 14 and the ternary/binary converting circuit 104 shown in FIG. 15 may be provided to receive an output of the ternary discrimination circuit 102, such that the outputs of the circuits 103 and 104 are simultaneously written into the memory 66 as the audio data, or selected one of the outputs of the circuit 103 and 104 is written into the memory 66.

In addition, while in the above described first and second embodiments, the resampling frequency of the audio data is converted from 16.2 MHz to 12.15 MHz by the frequency converting circuit 101, the resampling frequency may be set to 48.6 MHz which is a least common multiple of 16.2 MHz and 12.15 MHz to thin out down to one-fourth the sampling of the audio data A/D converted at this frequency at an appropriate timing and an equal interval, thereby generating the audio data of 12.15 MHz to be applied to the ternary discrimination circuit 102.

As the foregoing, according to the first and the second embodiments of the present invention, the information amount of the audio data to be digitally recorded can be drastically compressed to reduce a recording rate for the entire MUSE signal. As a result, reduction of a recording wavelength can be prevented and occurrence of errors in the recording data can be suppressed without enlarging a size for a VTR system.

Figure 5:
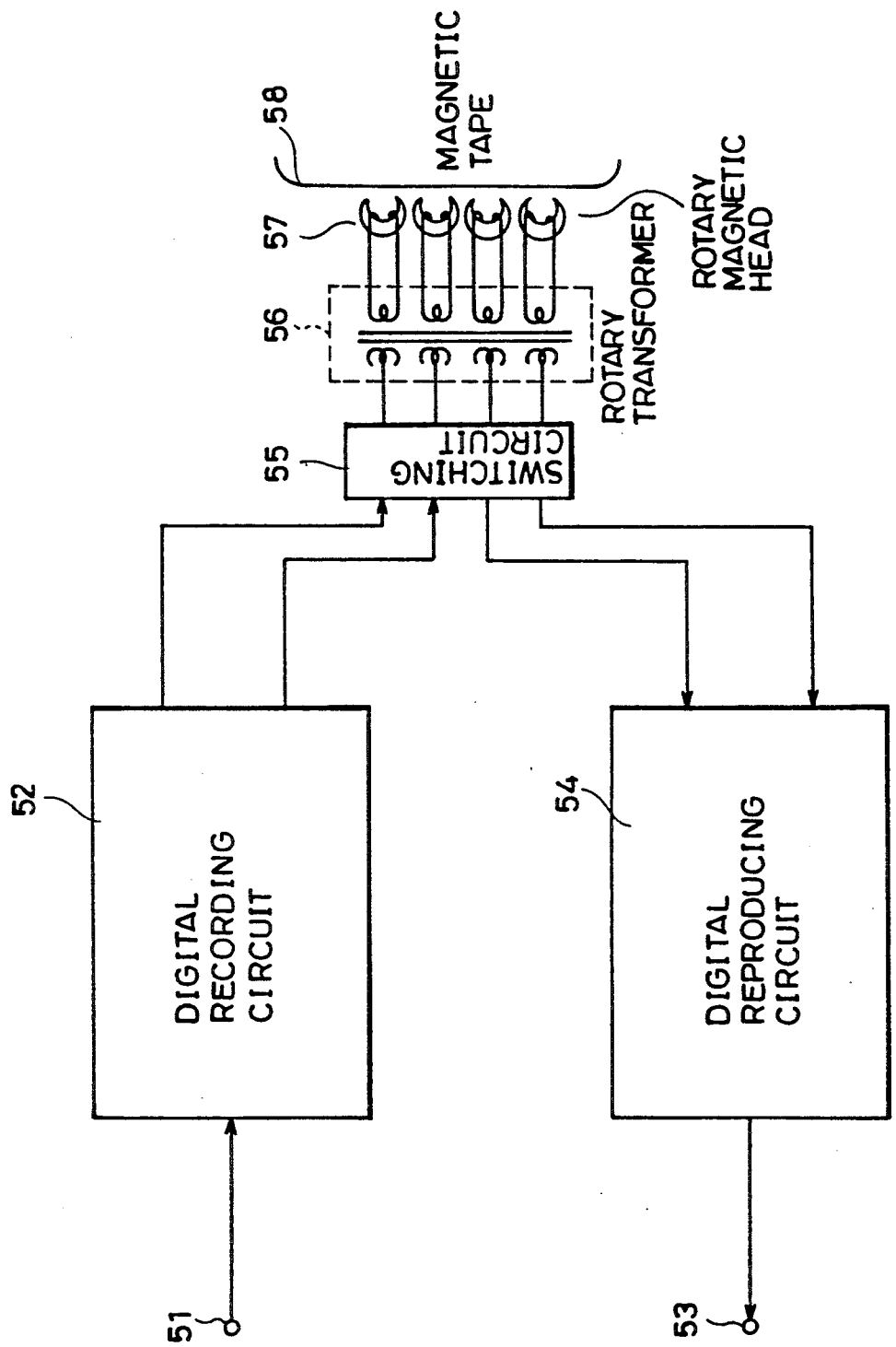
FIG. 5 is a schematic block diagram showing an entire structure of a digital VTR.
Figure 16:
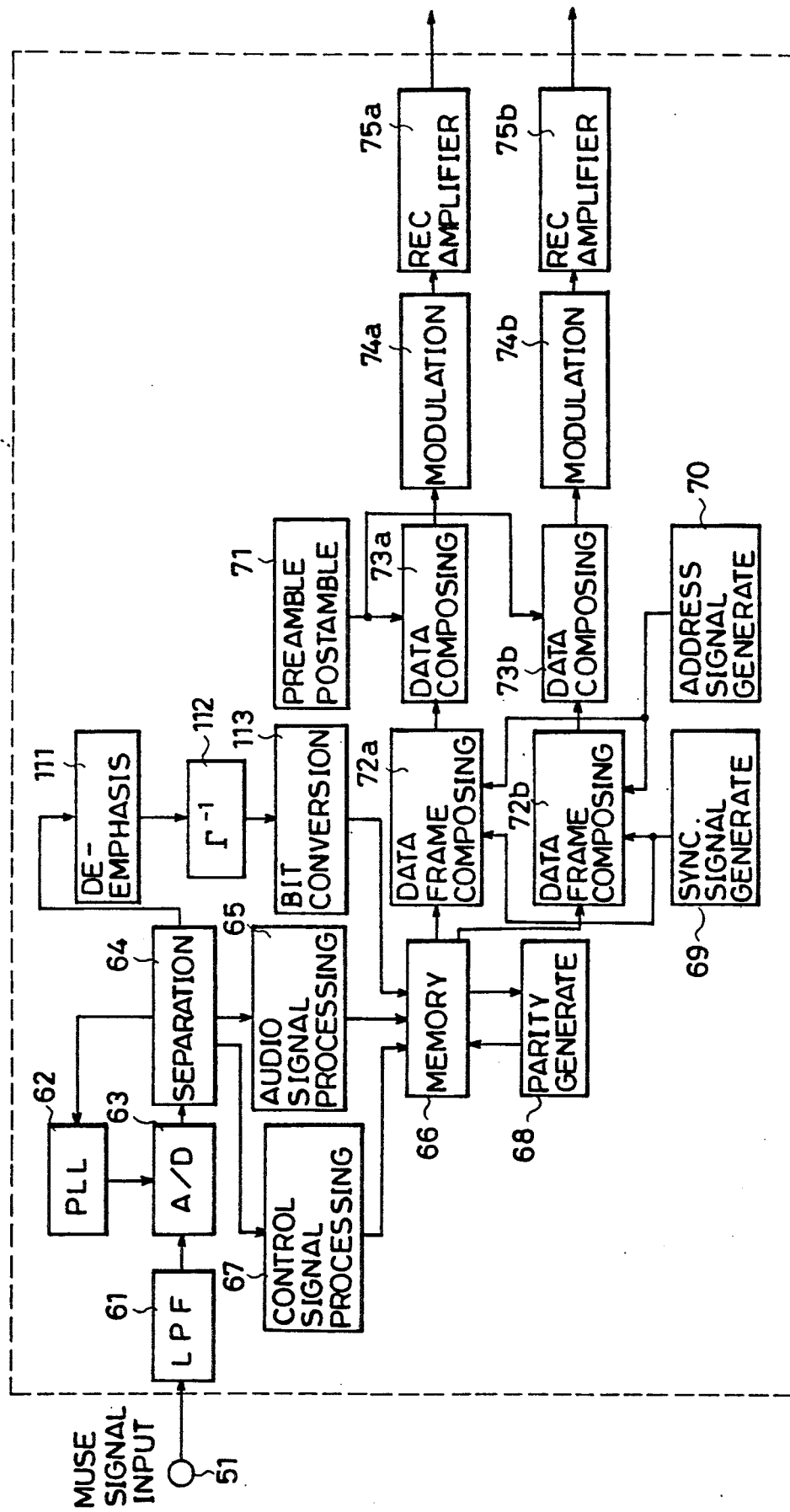
FIG. 16 is a block diagram showing a digital recording circuit of a digital VTR according to a third embodiment of the present invention.
Figure 17:
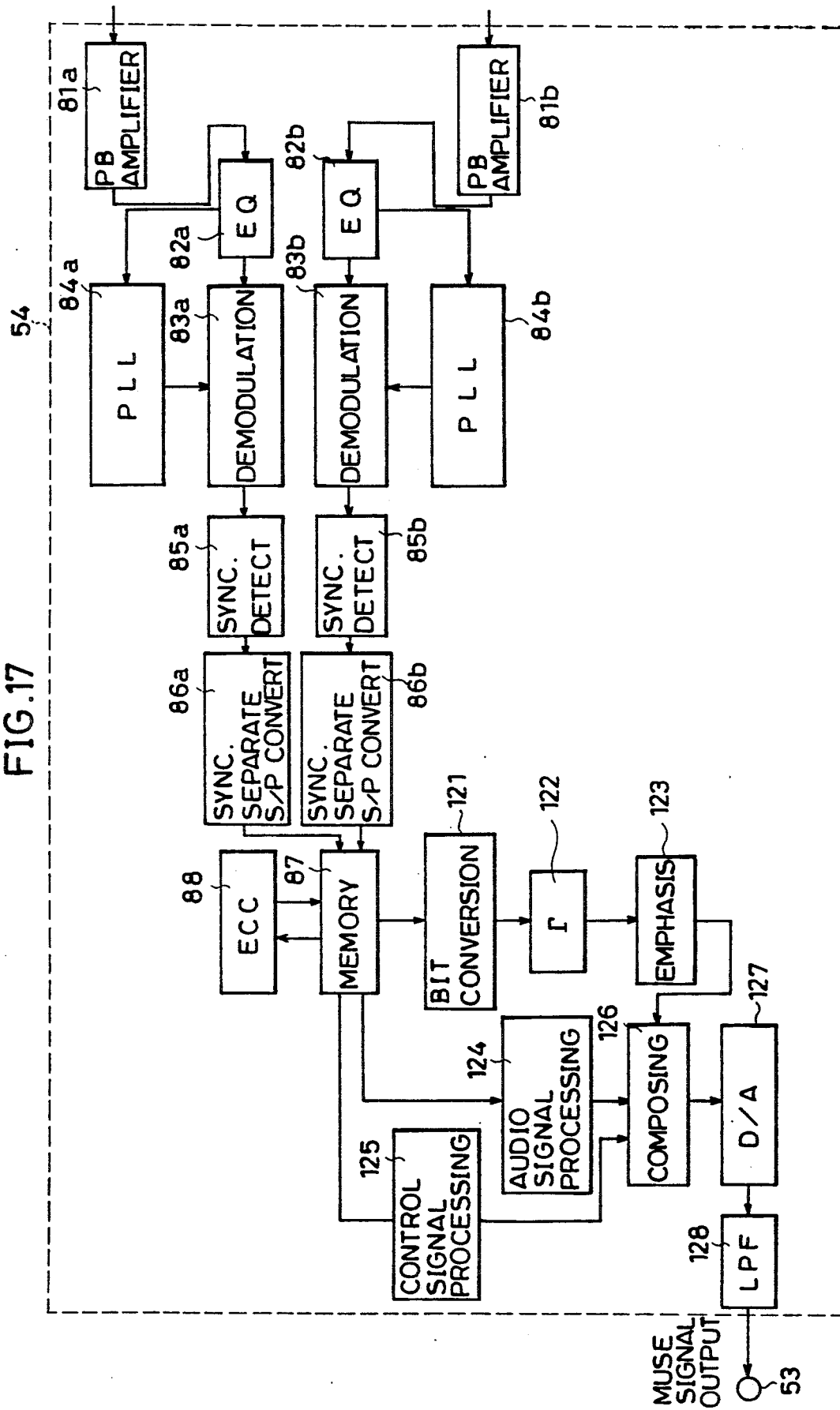
FIG. 17 is a block diagram showing a digital reproducing circuit of the digital VTR according to the third embodiment of the present invention.

FIGS. 16 and 17 are block diagrams showing a digital recording circuit and a digital reproducing circuit respectively of a digital VTR according to a third embodiment of the present invention respectively. The digital recording circuit 52 shown in FIG. 16, in the same manner as the prior art shown in FIG. 5, receives a MUSE signal through the input terminal 51, modulates the same into a recording signal of two channels and supplies the modulated signal to the switching circuit 55 (FIG. 5). A magnetic recording and reproducing system (55-58) of the digital VTR according to this embodiment is the same as that of the prior art shown in FIG. 5. Furthermore, the reproduced signal from the switching circuit 55 of FIG. 5 is applied to the digital reproducing circuit 54 of FIG. 17, which circuit demodulates the same to be restored as a MUSE signal and outputs the thus restored signal through the output terminal 53.

First, the digital recording circuit 52 shown in FIG. 16 is the same as the conventional digital recording circuit 52 shown in FIG. 6 except for the following points. More specifically, a de-emphasis circuit 111, a reverse gamma correction circuit 112 for transmission path and a bit converting circuit 113 are interposed in a video signal path between the separation circuit 64 and the memory 66. The video data is separated by the separation circuit 64 from the MUSE signal A/D, which has been converted by the A/D converter 63, and applied to the de-emphasis circuit 111. The separated video data is a signal of ten bits of resolution having a waveform shown as waveform (4) in FIG. 13E. The de-emphasis circuit 111, having the de-emphasis characteristic and instantaneous amplitude expansion characteristic shown in FIGS. 13C and 13D respectively, subjects the video signal separated from the digital MUSE signal by the separation circuit 64, to the de-emphasis processing and the instantaneous amplitude expansion processing, thereby applying the video signal, having the shape of waveform (6) in FIG. 13E to the reverse gamma correction circuit 112 for a transmission path. The video data reverse-gamma corrected by the reverse gamma correction circuit 112 is further applied to the bit number converting circuit 113, wherein the number of bits thereof, is converted from ten bits to eight bits. As shown in waveform (6) in FIG. 13E, the de-emphasized video signal herein is in the range of a level width of 128 to 127, so that conversion from ten bits to eight bits can be implemented by simply taking out a most significant code bit and the following less significant seven bits, that is, the most significant eight bits. Meanwhile, it may be constituted such that the above described processings such as the ternary discrimination of the audio data shown in the above described first and the second embodiments is performed in the audio signal processing circuit 65.

As the foregoing, the video signal converted to have eight bits of resolution waveform (6) in FIG. 13E is recorded on the magnetic tape. Then, the video data of eight bits read out from the magnetic tape during the time of reproduction is supplied to the digital reproducing circuit 54 shown in FIG. 17. The digital reproducing circuit 54 shown in FIG. 17 is the same as the conventional digital reproducing circuit 54 shown in FIG. 10 except for the following points. Namely, in place of the MUSE interface circuit 89 of FIG. 10, a bit number converting circuit 121, a gamma correction circuit 122 for transmission path, an emphasis circuit 123, an audio signal processing circuit 124, a control signal processing circuit 125, a composing circuit 126, a D/A converter 127 and an LPF 128 are provided.

Figure 3:
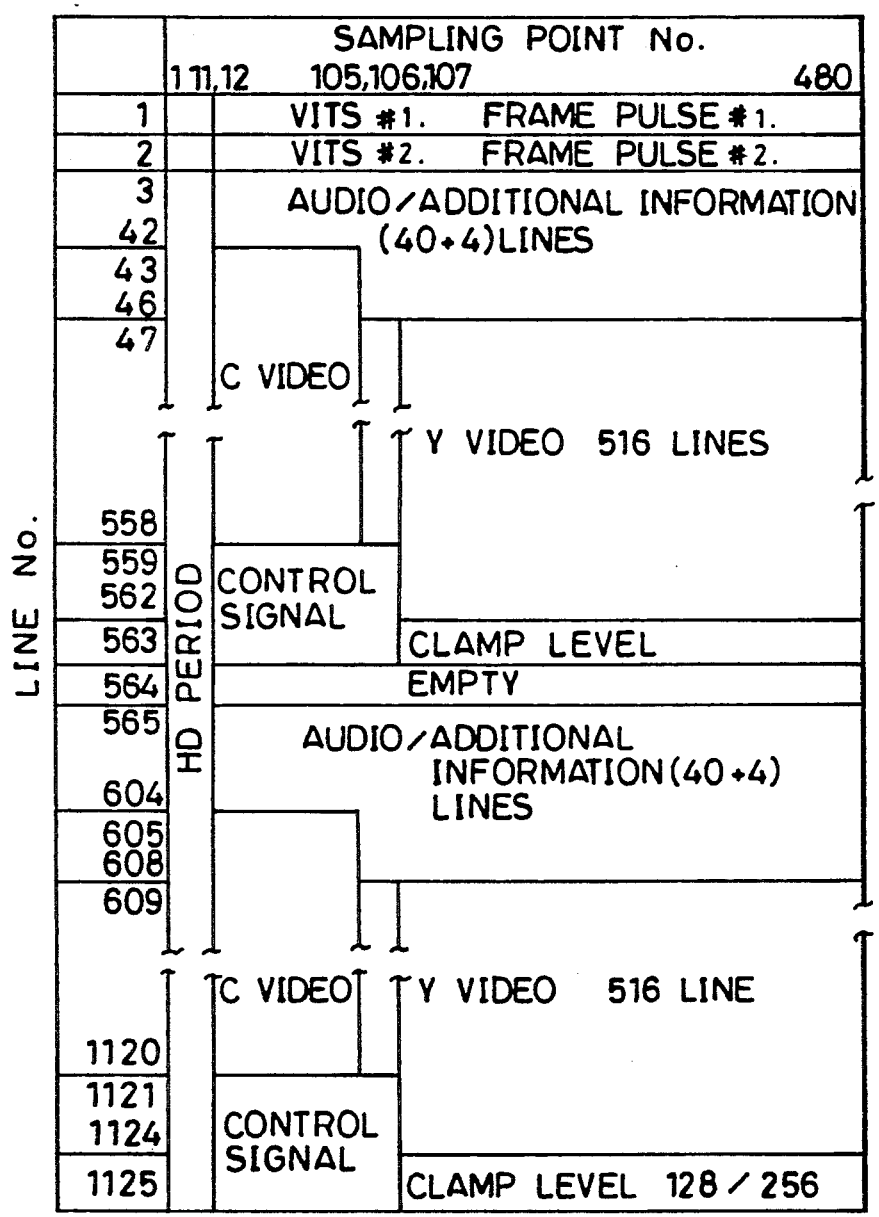
FIG. 3 is a diagram schematically showing a signal form of the MUSE signal.

Described in more detail, each of video, audio and control signals each subjected to error correction and the like by the error correction circuit 88, is read out from the memory 87. First, the video data having eight bits of resolution read from the memory 87 is converted into the data of ten bits of resolution by the bit number converting circuit 121, which is further applied to the gamma correction circuit 122 for the transmission path. An output of the gamma correction circuit 122 is applied to the emphasis circuit 123 having the emphasis characteristic and instantaneous amplitude compression characteristic shown in FIGS. 13A and 13B respectively, wherein the output is subjected to the emphasis and instantaneous amplitude compression processings. As a result, the video data having waveform as shown by waveform (3) in FIG. 13E is outputted from the emphasis circuit 123 to be applied to the composing circuit 126. In addition, the audio signal read out from the memory 87 is converted from the binary signal to the ternary signal by the audio signal processing circuit 124, with the ternary level indicated in ten bits being allotted to the ternary signal. Binary level indicated in ten bits is allotted by the control signal processing circuit 125 to the control signal outputted from the memory 87. After these processings, each signal is composed in the composing circuit 126 to constitute a MUSE signal of the signal form of FIG. 3. The MUSE signal thus obtained is D/A converted by the D/A converter 127, and thereafter bandwidth limited in the LPF 128 to be supplied as the MUSE signal through the output terminal 53.

Accordingly, in accordance with the third embodiment, during in the time of recording the MUSE signal in the digital VTR, since the video signal is once converted to have eight bits of resolution and then recorded on the magnetic tape, there will be no need to record the video signal having ten bits of resolution as conventional one, so that the information amount of the video signal to be digitally recorded can be drastically compressed. As a result, the recording rate for the entire MUSE signal can be reduced to prevent the generation of the errors in the recorded data.

Figure 2:
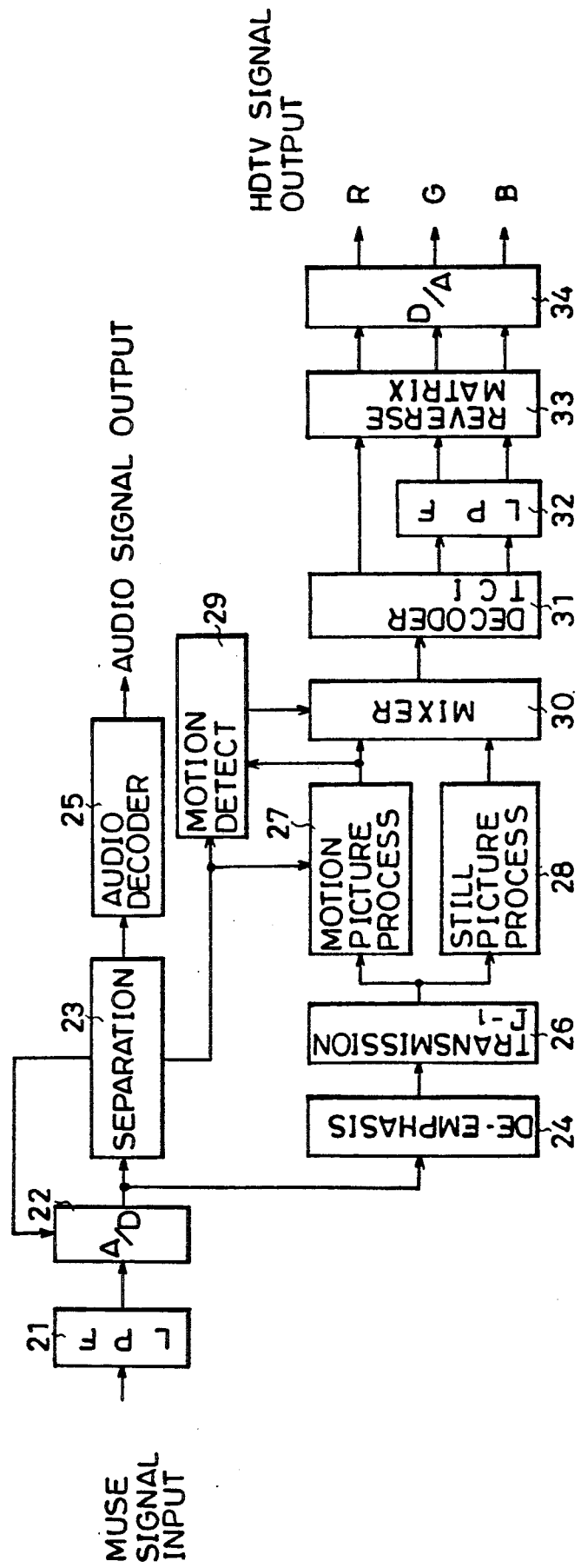
FIG. 2 is a schematic block diagram showing a structure of a conventional MUSE decoder.

The digital VTR in accordance with the third embodiment as shown in FIG. 16 and FIG. 17 is a VTR in which the MUSE signal is recorded and reproduced. Accordingly, in order to display the image produced by the video data reproduced by the VTR of this embodiment on a monitor picture frame, an output MUSE signal of the VTR should be supplied to a HDTV monitor after once being converted into a HDTV signal using the MUSE decoder, for example, shown in FIG. 2. In such a case, the de-emphasis processing is performed once again by the de-emphasis circuit (for example the circuit 24 of FIG. 2) in the MUSE decoder.

Figure 18:
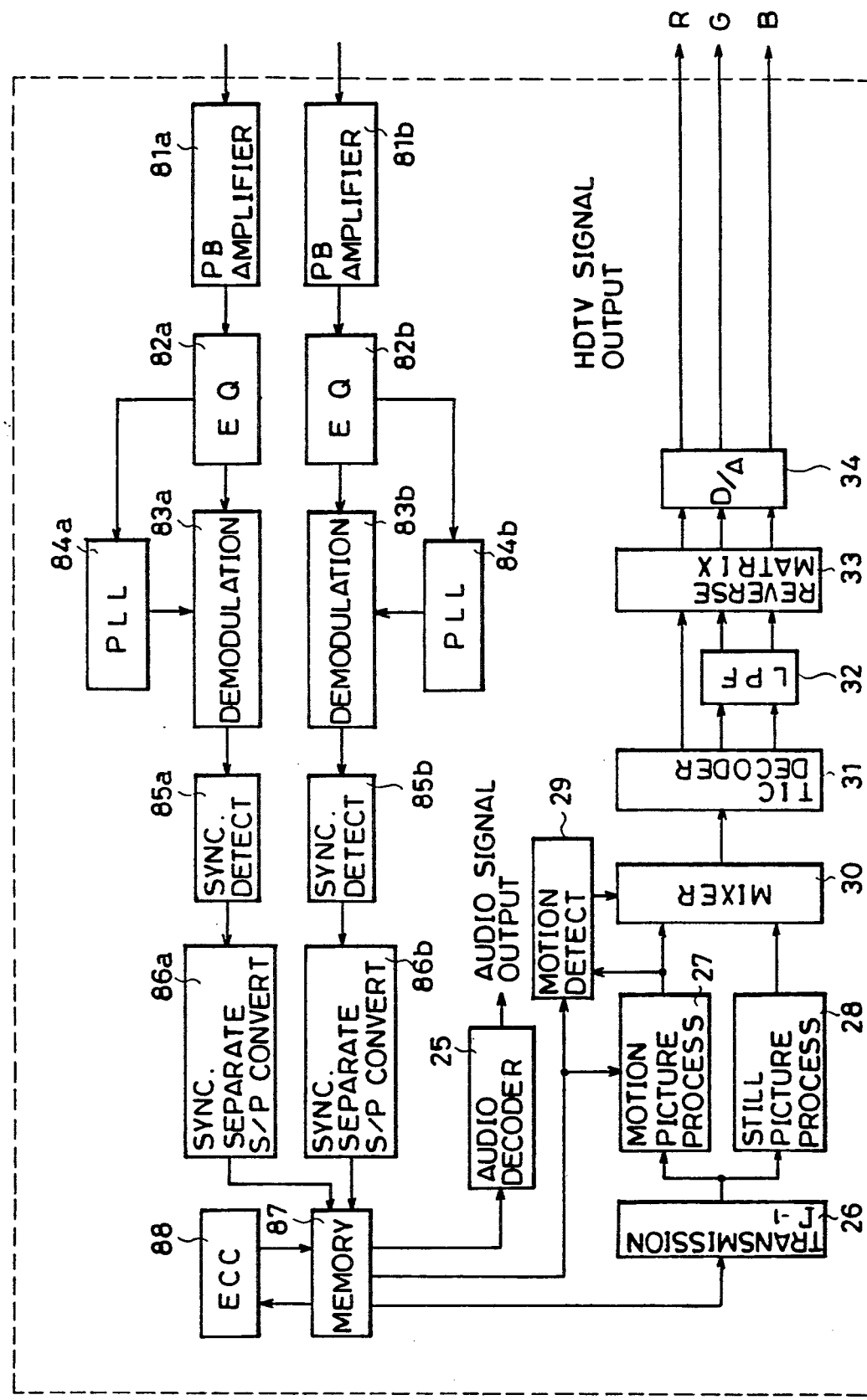
FIG. 18 is a block diagram showing a digital reproducing circuit of a digital VTR according to a fourth embodiment of the present invention.

An apparatus may be proposed in which the HDTV signal can be obtained directly from a reproduced video signal of the digital VTR by combining the digital VTR and the MUSE decoder. FIG. 18 is a schematic block diagram showing an apparatus in accordance with the fourth embodiment of the present invention which incorporates the MUSE decoder into the digital reproducing circuit of such a digital VTR. More specifically, in the fourth embodiment shown in FIG. 18, the output of the memory 87 in the digital reproducing circuit 54 of FIG. 17 is supplied directly to the respective circuits 26, 27 and 29 of FIG. 2 as the outputs of the separation circuit 23 and the emphasis circuit 24 of the MUSE decoder of FIG. 2, thereby eliminating the need for the respective circuits 121-128 of FIG. 17 and the respective circuits 21-24 of FIG. 2.

Figure 1:
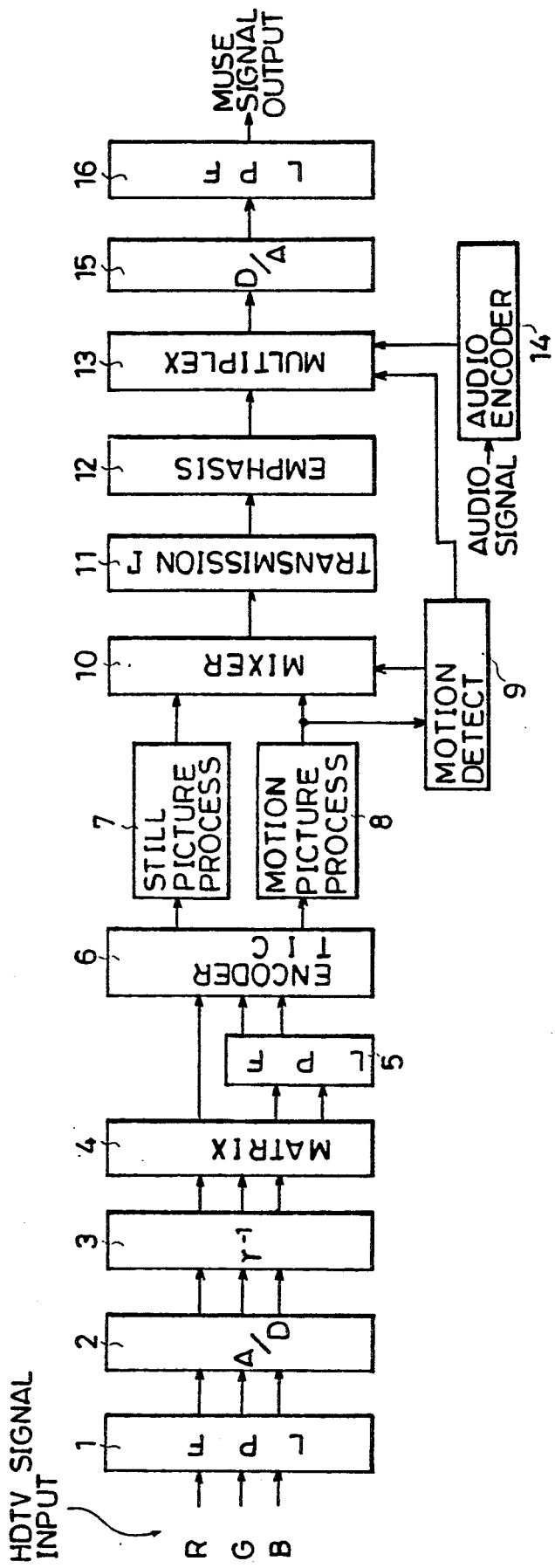
FIG. 1 is a schematic block diagram showing a structure of a conventional MUSE encoder.

In addition, the digital reproducing circuit 54 of the digital VTR in accordance with the third embodiment shown in FIG. 17 is structured as to output a MUSE signal subjected to the emphasis processing as a reproduced output of the VTR. Thus, the emphasis circuit 123 having the same structure as that of the emphasis circuit 12 provided in the MUSE encoder of FIG. 1 is required in the digital reproducing circuit 54, causing a circuit structure of the digital reproducing circuit to be larger.

Figure 19:
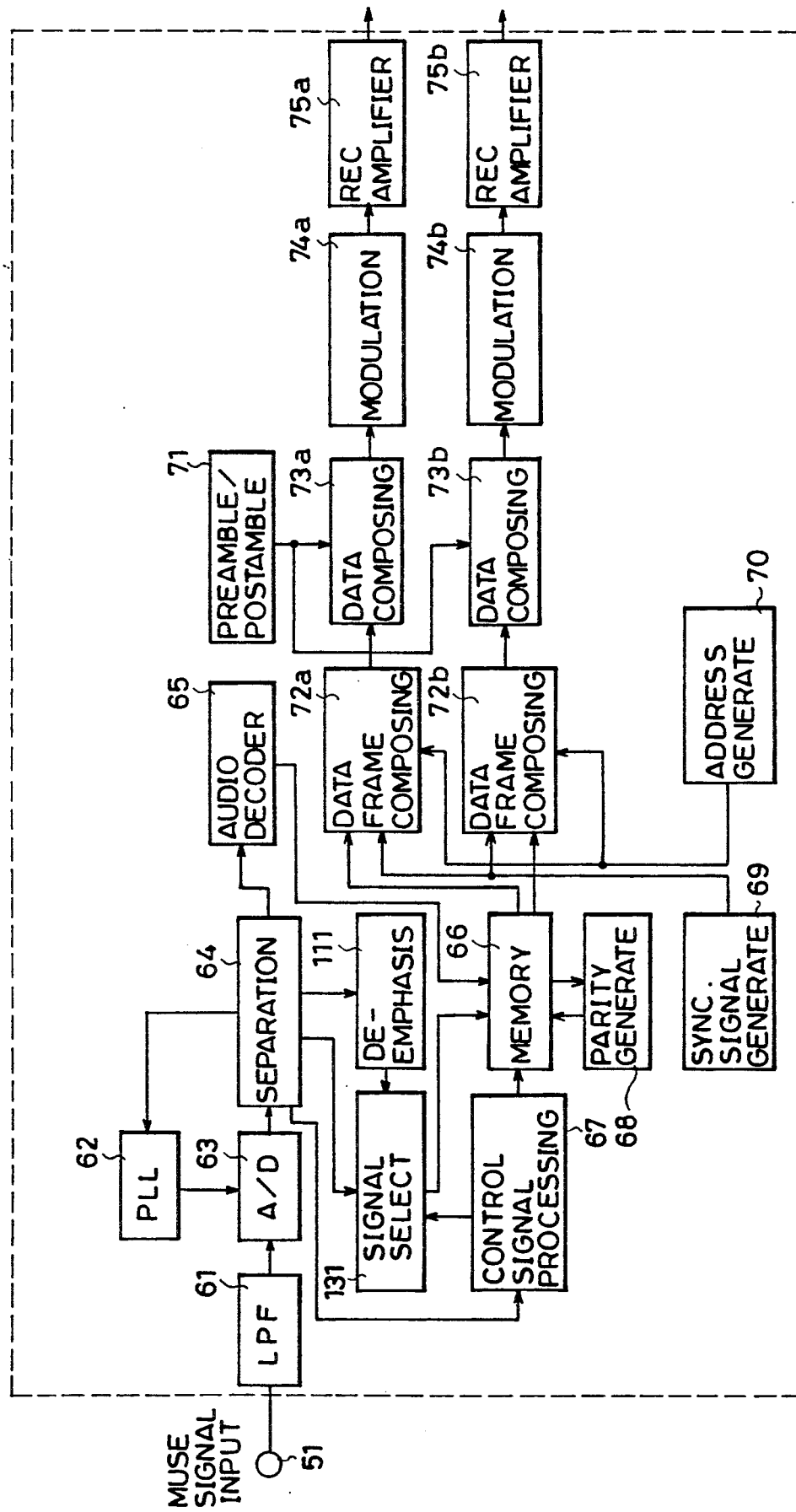
FIG. 19 is a block diagram showing a digital recording circuit of a digital VTR according to a fifth embodiment of the present invention.
Figure 20:
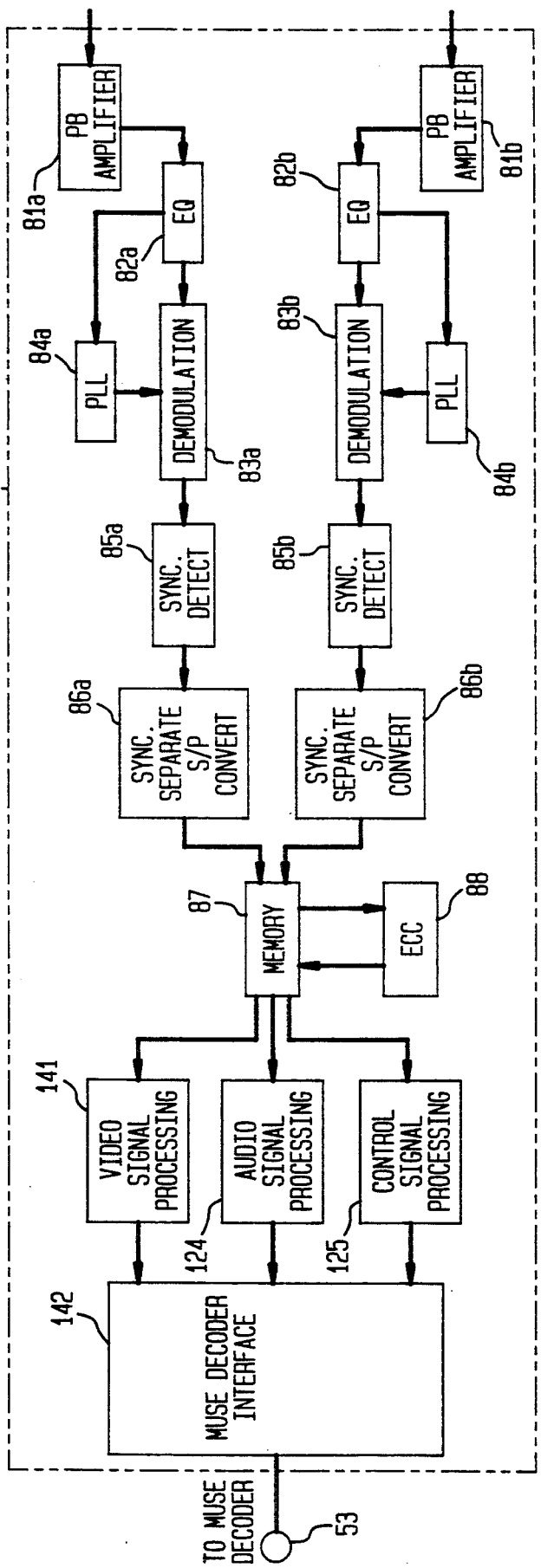
FIG. 20 is a block diagram showing a digital reproducing circuit of the digital VTR which is the fifth embodiment of the present invention.

FIG. 19 and FIG. 20 are block diagrams showing a digital recording circuit and a digital reproducing circuit, respectively of the digital VTR according to the fifth embodiment in which the above described problems are solved. The digital recording circuit 52 shown in FIG. 19 is the same as the conventional digital recording circuit 52 shown in FIG. 16 except for the following points. More specifically, the digital recording circuit 52 shown in FIG. 19 receives the MUSE signal through the input terminal 51 from, for example, the MUSE encoder shown in FIG. 1. The received MUSE signal includes the control signal having the contents shown in FIG. 4 with the value of the 20th bit thereof indicating whether the MUSE video signal is subjected to the emphasis processing or not. More specifically, in case that the MUSE video signal is subjected to the emphasis processing to be FM modulated, a value of the 20th bit of the control signal is "0", while in case that the MUSE video signal is not subjected to the emphasis processing and is AM modulated, the value is "1". The control signal processing circuit 67 discriminates the value of the 20th bit to control the signal selecting circuit 131 in accordance with the discrimination result. Namely, the signal selecting circuit 131 selects an output of the de-emphasis circuit 111 and writes the same into the memory 66 when the 20th bit of the control signal is "0", that is, it is subjected to the emphasis processing, and writes an output of the separation circuit 64 directly into the memory 66 when the 20th bit of the control signal is "1", that is, it is not subjected to the emphasis processing. The signal selecting circuit 131 contains the reverse gamma correction circuit 112 and the bit number converting circuit 113 of FIG. 16 to subject the selected video data to the above described reverse gamma correction and the bit number converting processings. Therefore, according to the digital recording circuit of FIG. 19, the video data is always outputted which is not subjected to the emphasis processing.

On the other hand, the digital reproducing circuit 54 of FIG. 20 does not include the emphasis circuit 123 shown in FIG. 17, therefore the digital reproducing circuit 54 outputs the MUSE signal not subjected to the emphasis processing from the output terminal 53. The control signal processing circuit 125 forcibly sets the 20th bit of the control signal of the outputted MUSE signal to "1" showing the AM modulation. As a result, the MUSE decoder of the monitor TV receiving the outputted MUSE signal processes the video signal without subjecting the same to the de-emphasis processing. Such a forced setting of the control signal may be performed by the control signal processing circuit 67 of the digital recording circuit 52 before recording on the magnetic tape.

As the foregoing, in accordance with the fifth embodiment of the present invention, the reproduced MUSE signal can be forcibly set to indicate the AM mode wherein no emphasis processing is performed, so that the digital reproducing circuit can do without an emphasis circuit.

While in the above described third and fifth embodiments, the video data is subjected to the de-emphasis processing after being A/D converted in the digital recording circuit, the analog video signal may be subjected to the de-emphasis processing first, and A/D converted thereafter. In such a structure, an amplitude of the A/D converted signal becomes smaller, so that the number of bits of the information to be digitally recorded can be further compressed.

In addition, while the above described first to fifth embodiments are examples in which the present invention is applied to the digital VTR as the magnetic recording and reproducing apparatus, the present invention is not limited to such a digital VTR and it may be applied to any kind of recording apparatuses (for example optical disk recording apparatus) for digitally recording a MUSE signal.

Furthermore, the present invention is not limited to such a MUSE signal and it may be applied to a HDTV signal transmitted in any kind of transmission system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording apparatus for digitally recording a transmission (MUSE) signal on a recording medium wherein the transmission signal comprises a high definition television (HDTV) signal having a total number of bits and has been bandwidth compressed and multiplexed, on a time division basis, with digital information such that the transmission signal contains a plurality of separate data elements, wherein one of the data elements is coded or modulated in a pre-defined manner using a number of bits that exceeds the total number of bits that form the HDTV signal, said recording apparatus comprising:

means for receiving the transmission signal and, in response thereto, separating the transmission signal so received into said plurality of separate data elements;

means, responsive to the one data element in the plurality of separated data elements, for reducing the number of bits that form said one data element in said plurality of separated data elements so as to form a compressed data element;

means for constructing a data track from said compressed data element and remaining ones of said plurality of data elements in the separated data elements; and means for recording said data track onto said recording medium.

2. The recording apparatus of claim 1 wherein:

said plurality of data elements comprises video data, audio data, control data and arbitrary data;

said one data element in said separated data elements is a digitized audio signal; and said bit number reducing means comprises means for converting said one data element in said separated data elements into a ternary signal and means for converting said ternary signal into a binary signal.

3. The recording apparatus of claim 1 wherein:

said plurality of data elements comprises video data, audio data, control data and arbitrary data;

said one data element is a video signal that has been subjected to emphasis processing; and said bit number reducing means comprises means for de-emphasizing said video signal.

4. A recording apparatus for digitally recording to MUSE signal on a recording medium, wherein the MUSE signal comprises a high definition television (HDTV) signal that has a total number of bits and that has been bandwidth compressed and multiplexed, on a time division basis, with arbitrary digital information, said MUSE signal comprising video data, audio data, control data and said arbitrary information, wherein said audio data or said arbitrary information has been coded in a pre-defined manner to form coded data having a number of bits that exceeds the total number of bits that form the HDTV signal, said recording apparatus comprising:

means for receiving the MUSE signal and, in response thereto, for separating the MUSE signal so received into the video data, the audio data, the control data and the arbitrary information;

means for decoding the coded data in said separated MUSE signal into a reduced number of bits so as to form compressed data;

means for constructed a data track from said compressed data and remaining ones of the data separated from said received MUSE signal; and means for recording said data track onto said recording medium.

5. The recording apparatus in claim 4 wherein said audio data or said arbitrary information is converted into a ternary signal.

6. The recording apparatus in claim 5 wherein said decoding means comprises means for discriminating each level of said ternary signal; and means for indicating in two bits each discriminated level of the ternary signal.

7. The recording apparatus in claim 5 wherein said decoding means comprises means for discriminating each level of said ternary signal; and means for converting discriminating levels of two successive ternary signals into a binary signal of three bits.

8. The recording apparatus in claim 4 further comprising means for reading data recorded on the recording medium in order to reproduce said MUSE signal recorded thereon.

9. A recording apparatus for digitally recording a MUSE signal on a recording medium, wherein the MUSE signal comprises a high definition television (HDTV) signal that has a total number of bits and that has been bandwidth compressed and multiplexed, on a time division basis, with arbitrary digital information, said MUSE signal comprising video data, audio data, control data and said arbitrary information, wherein said video data is modulated in a pre-defined manner so as to form modulated data having a number of bits that exceeds the total number of bits in said HDTV signal, said recording apparatus comprising:

means for receiving the MUSE signal and, in response thereto, for separating the MUSE signal so received into the video data, the audio data, the control data and the arbitrary information;

means for demodulating the modulated video data into demodulated video data having a reduced number of bits;

means for constructing a data track from said demodulated video data and remaining ones of the data separated from the received MUSE signal; and means for recording said data track onto said recording medium.

10. The recording apparatus in claim 9 wherein the video data has been subjected to emphasis processing.

11. The recording apparatus in claim 10 wherein the demodulating means comprises means for de-emphasizing said modulated video data to form de-emphasized video data, having a total number of bits; and means for reducing the total number of bits in said de-emphasized video data.

12. The recording apparatus in claim 11 further comprising means for reading data recorded on the recording medium in order to reproduce the MUSE signal recorded thereon, said reading means comprising means for emphasizing the data read from the recording medium.

13. The recording apparatus in claim 11 comprising:

means for reading the data recorded on the recording medium; and

MUSE decoder means for converting the data read from the recording means directly into an HDTV signal.

14. The recording apparatus in claim 10 wherein:

the control data comprises modulation information indicating whether the video data has been subjected to emphasis processing or not;

said demodulating means comprising:

means for discriminating the modulation information so as to determine a value thereof;

means for subjecting the video data to de-emphasis processing;

means, responsive to the value of the modulation information, for selecting for demodulation either an output of the de-emphasizing means when said video data has been subjected to the emphasis processing of said video data when said video data has not been subjected to the emphasis processing.

15. The recording apparatus in claim 14 further comprising means for reading the data recorded on the recording medium in order to reproduce the MUSE signal recorded thereon which has not been subjected to the emphasis processing, wherein said reading means comprises means for setting the value of the modulation information of the control data so as to indicate the video data read from the recording medium has not been subjected to the emphasis processing.

16. The recording apparatus in claim 14 further comprising means for reading the data recorded on the recording medium in order to reproduce the MUSE signal recorded thereon which is not subjected to the emphasis processing, wherein said demodulating means comprises means for setting the value of the modulation information of the control data so as to indicate that said video data read from the recording medium has not been subjected to the emphasis processing.

* * * * *